Nov. 6, 1951 L. A. THOMPSON 2,573,998
OSCILLOGRAPH-GALVANOMETER
Filed Nov. 23, 1945

INVENTOR.
LOUIS A. THOMPSON.
BY
J. D. Douglass

Patented Nov. 6, 1951

2,573,998

UNITED STATES PATENT OFFICE 2,573,998

OSCILLOGRAPH-GALVANOMETER

Louis A. Thompson, Rocky River, Ohio, assignor to NEA Service, Inc., Cleveland, Ohio, a corporation of Delaware Application November 23, 1945, Serial No. 630,404

8 Claims. (Cl. 171—95)

This invention relates to improvements in oscillograph-galvanometers and more particularly to an oscillograph-galvanometer useful in the transmission of pictures.

Although the invention about to be described will be described particularly as being useful in the transmission or reception of pictures by wire or radio, it will be appreciated that it is in no sense limited to such use but may be used in other places where an oscillograph-galvanometer is desired, and that, therefore, it is not my intention that the invention shall be limited to use in the picture transmission field.

Heretofore, it has become common practice to use an oscillograph-galvanometer in picture transmission apparatus for the purpose of swinging a beam of light either to cause the beam to be interrupted and thus replace a chopper or to apply a modulated current to the galvanometer to cause the same to be operated thereby to expose a picture.

The prior devices have usually been of an extremely delicate nature and very apt to be thrown out of adjustment if subjected to moderate shocks. Furthermore, the construction was such that a considerable amount of space was required for its installation, and this usually in places where space was at a premium. This was particularly true in connection with its use in the optical unit of a facsimile transmitter or receiver.

By my present invention I have provided an oscillograph-galvanometer which is extremely compact and which thus lends itself ideally to the use with allied equipment, such as in the optical unit of a facsimile receiver or transmitter. Furthermore, the operation of the device is such that a more efficient result is realized. The device as constructed provides for an increase in sensitivity, requiring less current to operate the same, and it is possible to provide a much wider swing than was heretofore possible in the prior art devices.

Generally speaking, the oscillograph-galvanometer of my invention contemplates a permanent magnet, an electro-magnet and a movable vane upon which a mirror may be supported, the vane being movable upon the application of a signal or energy to the electro-magnet winding.

In the accompanying drawings, I have illustrated an embodiment of my invention wherein.

Figure 1:
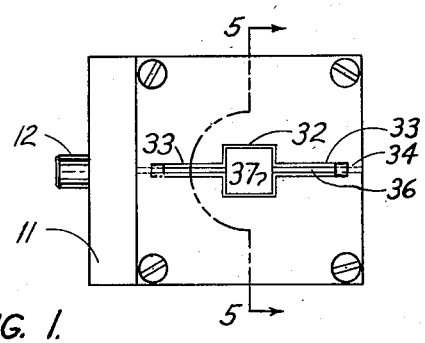
Fig. 1 is a top plan view of a unit constructed according to my invention, the device being shown on an enlarged scale of about two to one.
Figure 4:
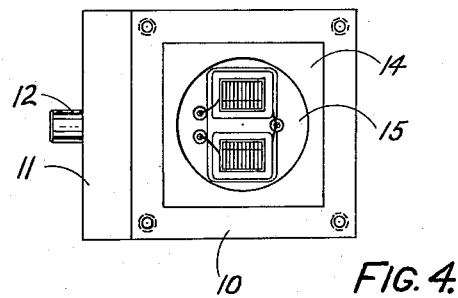
Fig. 4 is a view similar to Fig. 1 with the top plate removed.
Figure 2:
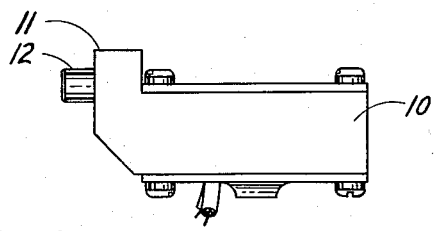
Fig. 2 is a side elevational view thereof.
Figure 3:
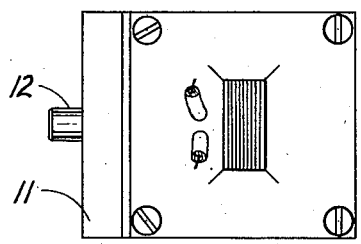
Fig. 3 is a bottom plan view thereof.

Referring now to the drawings, throughout which like parts have been designated by like reference characters, the device includes a casing 10, which may be substantially square in form, being provided with an upwardly extending portion 11 at one side from which a mounting pin 12 extends. It will be appreciated, however, that the shape of the exterior casing is merely a matter of convenience in this case, and that it can be made in any desired form.

The casing may be made of any non-magnetic material and is provided with a square opening which extends through the casing from top to bottom. In this opening there is disposed a permanent magnet structure 14 which entirely fills the opening. The permanent magnet may be any of the nickel-cobalt alloys such as the well known "Alnico" and which when magnetized provides a heavy and permanent magnetic flux. The magnet has an exterior surface which is square to conform to the opening in the casing and is provided with a central circular opening 15 extending vertically therethrough. It will be seen that the shape of the magnet lends itself readily to the grinding operations for shaping and fitting it to the casing, for, as is well known, "Alnico" is extremely hard and brittle and, in the ordinary sense, not machineable.

The magnet is magnetized so that it is polarized in a vertical direction; that is, the upper end of the magnet may be a north pole and the lower end a south pole. It will be appreciated that the polarization is also a matter of choice, and it may be immaterial which end is north or south.

The electromagnet portion of the device includes a bottom plate 17 secured to the housing 10 by screws 18 and which supports the core lamination 19. The laminations of the electromagnet are U shaped, and the bases thereof extend through a rectangular opening in the bottom plate and are secured therein by soldering or the like as indicated at 20. The pole pieces 21 extend upward from the base, in spaced relation to each other and the wall of the permanent magnet, the upper ends being slanting as indicated at 22 which concentrates the flux in a small area at their extremities.

The coils for poles 21 are shown at 23 being disposed around the poles with the ends abutting a piece of insulating material 24 at plate 17. The leads 26 for the coils 23 may be taken off from the coils and insulated by spaghetti tubing 27 which extends through appropriate openings in the plate 17 exteriorly of the housing.

The top of the housing is closed by a plate 30 held in place by screws 31. The plates 17 and 30 hold the parts in assembled relation and are of ferromagnetic material.

The top plate 30 is provided with a central opening 32, of square formation, disposed opposite the poles 21 and from opposite sides of which are extended narrow elongated openings 33. On the under side of the plate there are provided grooves 34 which extend from the openings in prolongation thereof across or nearly across the remainder of the plate to the edge.

The moving vane includes a wire or rod like member 36, the ends of which lie in the grooves 34 and are secured therein by soldering or the like, and the center portion of which traverses the opening 32 and has secured thereto the magnetic plate or vane 37. The plate may be secured to the rod by soldering as indicated at 38.

The wire or rod 36 is preferably of beryllium copper alloy which may be tempered, and has sufficient resiliency that the plate 37 may rotate or swing about the axis of the rod upon the application of suitable magnetic forces thereto by the energization of the coils 23, but always returns to its normal position flush with the surface of the plate when the forces are removed.

Figure 6:
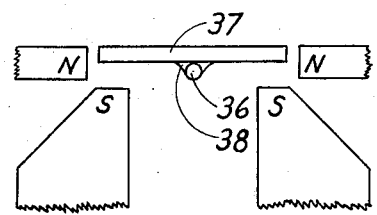
Fig. 6 is a diagrammatic view illustrating the action of the device.
Figure 5:
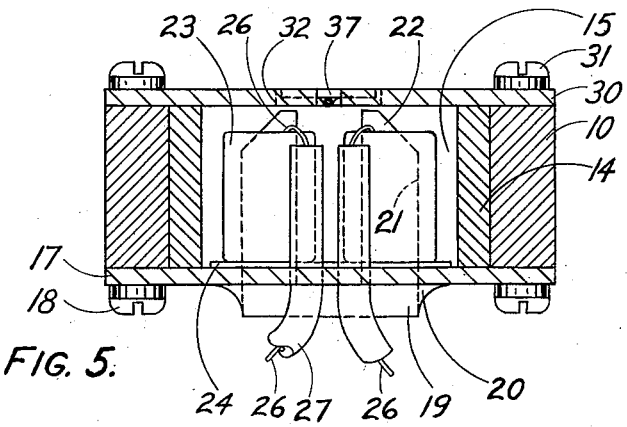
Fig. 5 is an enlarged section taken on the line 5—5 of Fig. 1.

For the purpose of explanation, it will be assumed that the upper end of the permanent magnet is a north pole and that the lower end is a south pole. It will be seen that the entire top plate 30, being ferromagnetic material, is a north pole and that the bottom plate is a south pole. The flux from the bottom plate is conducted to the laminations 21—22 which extend close to the bottom of the vane 37 which causes the ends 22 to be of south polarity. The edges of the vane are disposed in the region of the very high flux between the north and south poles (Fig. 6).

The laminations 21—22 are preferably of soft silicon iron and therefore the retentivity is low but their magnetic permeability is high.

In one method of operation the coils 23 are connected in opposing relation in such a manner that when they are energized by a current, the poles become oppositely polarized. In such a case it will be seen that this would result in one of the poles 22 being provided with a heavier south flux, which would be in addition to the south flux already present, and the other would be provided with a north flux which would oppose and lessen, if not completely overcome, the south pole flux present.

Because the vane is surrounded by a north pole flux, and the air gap between the vane and the pole is very small, merely large enough to permit freedom of movement of the vane, the vane also participates of this flux and becomes part of the north pole. Then because the vane can move about the axis of the support 36, due to the resiliency of the support, the vane will be repelled on the side where the north pole on the electromagnet exists and attracted on the side of the strongly south pole. If the current in the electromagnet is reduced, the movement of the vane is reduced accordingly until upon cessation of current the spring torsion in the support 36 will return the vane to its normal position as illustrated in Fig. 6. Upon a reversal of current through the windings the vane will move in exactly the opposite direction, hence upon the application of an alternating current to the windings, the vane will oscillate about the support 36 at a frequency dependent upon the frequency of the oscillator and in a magnitude dependent upon the amplitude of the oscillation.

Therefore, it will be seen that the vane can and will oscillate following amplitude modulated alternating current which may be in the form of a signal such as that resulting from the scanning of a picture.

One of the difficulties of prior devices was the limitation in the amplitude of the swing that could be obtained. I have found that this device may be operated to provide a considerably higher amplitude of oscillations than was heretofore possible. This is particularly useful when the device is used to provide an interrupted source of light for scanning a picture such as is shown in my Patent No. 2,284,027, of May 26, 1942. If it be assumed that the frequency at which the light is to be interrupted is 1920 cycles per second, it is possible to arrange the natural frequency of the vane to be 1920 cycles. It will be remembered that the vane is supported on the spring member 36, which may be beryllium copper alloy; and that this member is supported in the grooves 34, and extends longitudinally of the narrow channels 33 which open into the central opening 32. The vane can be tuned to the desired frequency by adding solder at the ends of the support 35 in the slot 33 to effectively shorten its length. This is preferably done while applying a current of the desired frequency to the coils 23 and observing the amplitude of the swing by means of a stroboscope. In this manner solder is added or removed until the largest or desired amplitude is attained.

Another manner of operation which I have found to be particularly effective is based upon the fact that it may be desirable to set the device to operate at a slightly different resonant point than the operating frequency of the associated circuit so that as the apparatus heats up to the operating temperature, the increase in heat after a certain period will cause the device to be operating at the desired frequency; that is, when cold, it may operate at one frequency and when warm, at another. Hence, the natural resonant frequency will change. Therefore, if the resonant frequency when cold is high as the device comes up in temperature due to operation and heating of the ambient air surrounding it, the frequency will drop to the desired frequency.

Another mode of operation contemplates so adjusting resonant frequency by applying solder to the ends of the support so that it is either higher or lower than the operating frequency. This makes it possible to apply a signal the carrier frequency of which may be higher or lower than the resonant frequency of the vane and thus cause the vane swing to more correctly follow amplitude variations when a picture signal, which may be an amplitude modulated alternating signal, is applied thereto. That is, as previously stated, if the vane is tuned to a certain resonant frequency by applying the solder as indicated, then, if a signal is applied, the carrier of which departs from the tuned frequency of the vane, it will have less amplitude. As the carrier is changed upon approach to the resonant frequency of the vane, the amplitude of movement of the vane will increase. The response curve for the vane will then be of the order of the familiar resonant curve. However, with the vane set for a frequency higher or lower than the carrier frequency the signal will fall on one side or the other of the vane frequency which enables the signal to be applied to a linear portion of the vane frequency response curve.

The device also adapts itself to the stylus form of recording where a stylus is used to cause the impression or recording on the material for receiving a picture. In this case, if the so-called "hill and dale" recording is desired, the coils are connected series aiding instead of opposing. When so connected, the electro-magnet poles would always be of like polarity, both changing from north to south, or vice versa, which would result in the vane being bodily attracted to and from the poles rather than tilted as previously described. The stylus could be attracted directly to the vane or connected thereto through a suitable lever system of which there are many known to those versed in the art. If lateral recording is desired, it would be connected as previously described, wherein the vane would rotate.

In cases where the vane is used to reflect light, I have found it expedient to polish the upper surface of the vane, and silver or chrome plate same to cause the actual surface to be the mirror. This enables high speed operation to be effected without danger of dislodging the mirror. I have also found it practical, however, to attach a separate mirror directly to the vane.

It will thus be seen that I have provided an improved oscillograph-galvanometer, which is extremely compact in form, and which is very sensitive yet rugged and economical of construction.

Furthermore, although the invention is described in connection with facsimile transmission, it will be apparent that the vane may have a stylus attached thereto which will enable it to be used as a pickup head for sound recording or reproduction. In this event, because it is turnable, it adapts itself to high fidelity recording and reproduction. It will also be apparent to those versed in the art that the structure is useful for recording on film, and that it is possible to use it for either variable density or variable area recording.

I am aware that numerous and extensive departures may be made therefrom without departing from the spirit or scope of my invention.

I claim:

1. An apparatus of the class described including a permanent magnet formed with a bore extending in the direction of its polarization, magnetically permeable supports provided at the ends of said magnet, an electromagnet carried by one support and extending through said support to a position spaced from the other support and a movable vane carried by said other support in closely spaced relation to said electromagnet.

2. An oscillograph-galvanometer including a polarized permanent magnet formed with a bore extending therethrough in the direction of its polarization and opening through the opposite poles, ferromagnetic supports provided at the ends of said magnet, an electro-magnet including laminations carried by one support and extending through said support to a position spaced from the other, coils carried by said core, and a movable vane carried by said other support in closely spaced relation to said core.

3. An apparatus of the class described including a housing, a permanent magnet carried by said housing and comprising a bar magnet having its opposite ends of opposite polarity, an opening extending through said magnet and the faces of said poles, plates for said housing secured thereto being of ferromagnetic material and each disposed in engagement with a pole face of said magnet, an electromagnet comprising a plurality of U shaped laminations rigidly and magnetically secured to one of said plates with the legs extending through said opening, a vane carried by said other plate opposite the ends of said legs and windings on each of said legs adapted to be energized by an electric current to actuate said vane.

4. An oscillograph-galvanometer comprising a high flux permanent magnet, said magnet formed with a bore extending through the magnet and through the opposite poles thereof, supporting members of highly permeable material disposed on the opposite ends of said magnet, an electromagnet carried by one of said supports and having spaced poles and windings thereon, said spaced poles extending through said bore and being magnetically connected to one end of said magnet and extending in spaced relation to the other support, a vane carried by the other support in spaced relation to the poles of the electromagnet and subject to the combined influence of the permanent and electro-magnetic fields.

5. An oscillograph-galvanometer comprising a high flux permanent magnet, said magnet formed with a straight bore extending entirely through the magnet and opening through the opposite poles thereof, supporting members of highly permeable material, each magnetically connected to an opposite pole of said magnet and extending through said bore, an electromagnet carried by one of said poles formed with soft iron laminations and provided with a base magnetically connected to one of said supports and having a pair of spaced poles with windings thereon, said spaced poles extending through said bore in closely spaced relation to the other support, said last mentioned support being formed with an opening opposite to said bore, a soft iron vane carried by said support in spaced relation to the walls of said opening and to the poles of the electromagnet and subject to the combined influence of the permanent and electro-magnetic fields, said supporting means for said vane being a torsion rod of non-magnetic material carried by said support and supporting said vane for tilting movement about the axis of said rod.

6. An oscillograph-galvanometer comprising a high flux permanent magnet, said magnet formed with a straight bore extending entirely through the magnet and opening through the opposite poles thereof, supporting members of highly permeable material, each magnetically connected to an opposite pole of said magnet and extending through said bore, an electromagnet carried by one of said supports formed with soft iron laminations and provided with a base magnetically connected to one of said supports and having a pair of spaced poles with windings thereon, said spaced poles extending through said bore in closely spaced relation to the other support, said last mentioned support being formed with an enlarged opening opposite to said bore and with restricted openings extending outward from opposite sides of said enlarged opening, a soft iron vane and a resilient support therefor, said support being disposed in said restricted openings and said vane carried by said support in spaced relation to the walls of said enlarged opening and to the poles of the electro-magnet and subject to the combined influence of the permanent and electro-magnetic fields, said supporting means for said vane being a torsion rod of non-magnetic material carried by said support and supporting said vane for tilting movement about the axis of said rod, and means in said restricted opening engageable with the walls of the opening and the rod to determine the resonant frequency of the vane.

7. An oscillograph-galvanometer comprising a high flux permanent magnet, said magnet formed with a straight bore extending entirely through the magnet and opening through the opposite poles thereof, supporting members of highly permeable material, each magnetically connected to an opposite pole of said magnet and extending through said bore, an electromagnet carried by one of said supports formed with soft iron laminations and provided with a base magnetically connected to one of said supports and having a pair of spaced poles with windings thereon, said spaced poles extending through said bore in closely spaced relation to the other support, said last mentioned support being formed with an enlarged opening opposite to said bore and with restricted openings extending outward from opposite sides of said enlarged opening, a soft iron vane and a resilient support therefor, said support being disposed in said restricted openings and said vane carried by said support in spaced relation to the walls of said enlarged opening and to the poles of the electro-magnet and subject to the combined influence of the permanent and electro-magnetic fields, said supporting means for said vane being a torsion rod of non-magnetic material carried by said support and supporting said vane for tilting movement about the axis of said rod, and means in said restricted opening engageable with the walls of the opening and the rod to effectively shorten the length of the rod and determine the resonant frequency of the vane.

8. An oscillograph-galvanometer comprising a high flux permanent magnet, said magnet formed with a straight bore extending entirely through the magnet and opening through the opposite poles thereof, supporting members of highly permeable material each magnetically connected to an opposite pole of said magnet and extending over said bore, an electro-magnet carried by one of said coils and formed with soft iron laminations and provided with a base magnetically connected to one of said supports and having a pair of spaced poles with windings thereon, said spaced poles extending through said bore in closely spaced relation to the other support, said last mentioned support being formed with an opening opposite to said bore and a soft iron vane carried by said support in spaced relation to the walls of said opening and to the poles of the electro-magnet and subject to the combined influence of the permanent and electro-magnetic fields, said supporting means for said vane being a torsion rod of non-magnetic material carried by said support and supporting said vane for tilting movement about the axis of said rod, said rod supporting said vane in the plane of the surface of said plate and operable to return the vane to a level position with said face upon de-energization of said windings, the upper face of said vane comprising a mirror for the reflection of light.

LOUIS A. THOMPSON.

REFERENCES CITED

The following references are of record in the file of this patent:

UNITED STATES PATENTS

| Number | Name | Date |
|---|---|---|
| 1,975,280 | Lindenburg | Oct. 2, 1934 |
| 2,059,159 | Whitaker | Oct. 27, 1936 |
| 2,066,715 | Centeno | Jan. 5, 1937 |
| 2,189,311 | Dimmick | Feb. 6, 1940 |
| 2,201,811 | Clothier | May 21, 1940 |
| 2,207,064 | Maurer | July 9, 1940 |